United States Patent
Paulo et al.

(10) Patent No.: US 9,382,780 B1
(45) Date of Patent: Jul. 5, 2016

(54) VERTICAL SWIVEL CONNECTION ASSEMBLY AND SYSTEMS AND METHODS FOR USE THEREOF

(71) Applicants: Paulo Cezar Silva Paulo, Katy, TX (US); Alicia Quereguan, Houston, TX (US); Claire Meziel Powell, Houston, TX (US)

(72) Inventors: Paulo Cezar Silva Paulo, Katy, TX (US); Alicia Quereguan, Houston, TX (US); Claire Meziel Powell, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 91 days.

(21) Appl. No.: 14/805,074

(22) Filed: Jul. 21, 2015

(51) Int. Cl.
| | |
|---|---|
| *E21B 43/01* | (2006.01) |
| *E21B 19/02* | (2006.01) |
| *F16L 1/16* | (2006.01) |
| *F16L 1/20* | (2006.01) |
| *F16L 1/235* | (2006.01) |
| *E21B 19/00* | (2006.01) |

(52) U.S. Cl.
CPC ........... *E21B 43/0107* (2013.01); *E21B 19/002* (2013.01); *F16L 1/161* (2013.01); *F16L 1/165* (2013.01); *F16L 1/205* (2013.01); *F16L 1/207* (2013.01); *F16L 1/235* (2013.01)

(58) Field of Classification Search
CPC ... E21B 41/04; E21B 43/013; E21B 43/0107; E21B 19/002; F16L 1/06; F16L 1/26; F16L 1/161; F16L 1/207; F16L 1/205; F16L 1/235; F16L 1/165
USPC ......... 166/338, 339, 340, 342, 344, 345, 347, 166/350, 367; 405/172, 170, 169, 168.1, 405/158, 184.4, 224.2, 224.3, 227, 173
See application file for complete search history.

(56) References Cited

U.S. PATENT DOCUMENTS

| | | | | |
|---|---|---|---|---|
| 3,466,882 A | * | 9/1969 | Broussard | F16L 1/15 405/168.1 |
| 3,503,219 A | * | 3/1970 | Houot | E21B 43/0107 166/351 |
| 3,546,889 A | * | 12/1970 | Hemphill | E21B 43/0107 405/168.1 |
| 3,955,599 A | * | 5/1976 | Walker | B21D 7/10 138/103 |
| 4,258,794 A | * | 3/1981 | Sizer | B63C 11/40 166/347 |

(Continued)

*Primary Examiner* — James G Sayre
(74) *Attorney, Agent, or Firm* — Karen R. DiDomenicis

(57) ABSTRACT

Disclosed is an apparatus for facilitating connection of a subsea flowline and a riser assembly so that the subsea flowline and the riser assembly can be jointly maneuvered in a subsea environment. A method and a system are provided in which the subsea flowline, the riser and the apparatus are connected. The apparatus includes a deployment skid having an integrated conduit having a 90° bend therein. One end of the conduit connects to a subsea flowline termination. A second end of the conduit is configured to receive the lower termination of the riser. The apparatus includes a coupling member configured to swallow and grasp the lower termination of the riser and the second end of the conduit. A pair of guide members, each guide member having an elongated slot along the length thereof, is pivotally connected at the base of the deployment skid and at the coupling member, one guide member on either side. The elongated slot is configured to allow the riser lower termination to be moved downwards vertically from an upper disengaged position to an engaged position thereby connecting the riser lower termination to the second end of the conduit.

10 Claims, 6 Drawing Sheets

(56) References Cited

U.S. PATENT DOCUMENTS

| | | | | |
|---|---|---|---|---|
| 4,270,775 A | * | 6/1981 | Noensie | E02B 17/00 277/606 |
| 5,730,551 A | * | 3/1998 | Skeels | F16L 37/002 166/343 |
| 7,628,568 B2 | | 12/2009 | Critsinelis | |
| 7,794,177 B2 | * | 9/2010 | DeLack | E21B 41/04 405/169 |
| 8,832,915 B2 | * | 9/2014 | White | E21B 41/04 29/237 |
| 2005/0271476 A1 | * | 12/2005 | Chiesa | E21B 43/0107 405/172 |
| 2011/0025041 A1 | * | 2/2011 | Birch | F16L 1/0246 285/24 |
| 2012/0090152 A1 | * | 4/2012 | White | E21B 41/04 29/464 |

\* cited by examiner

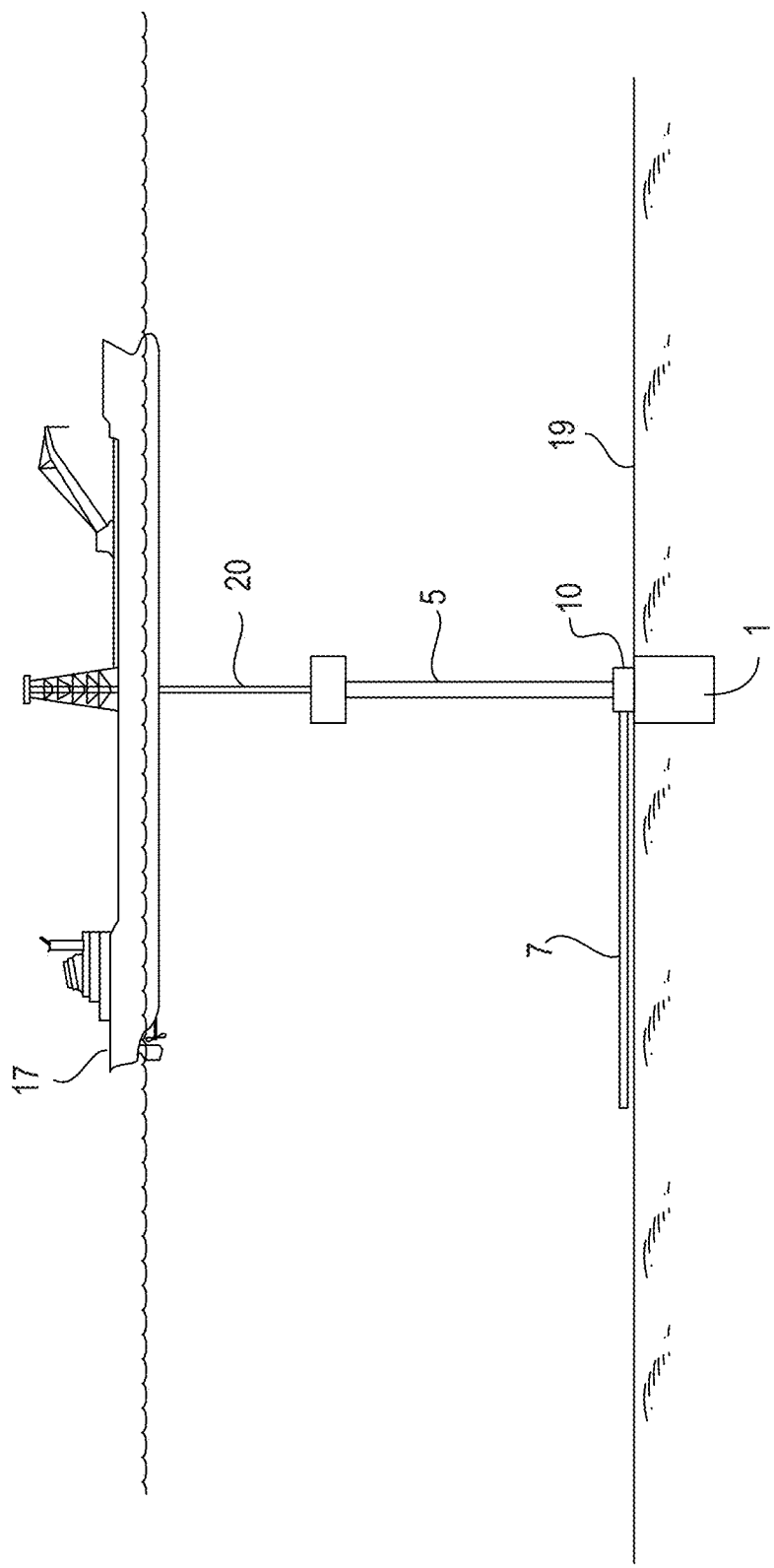

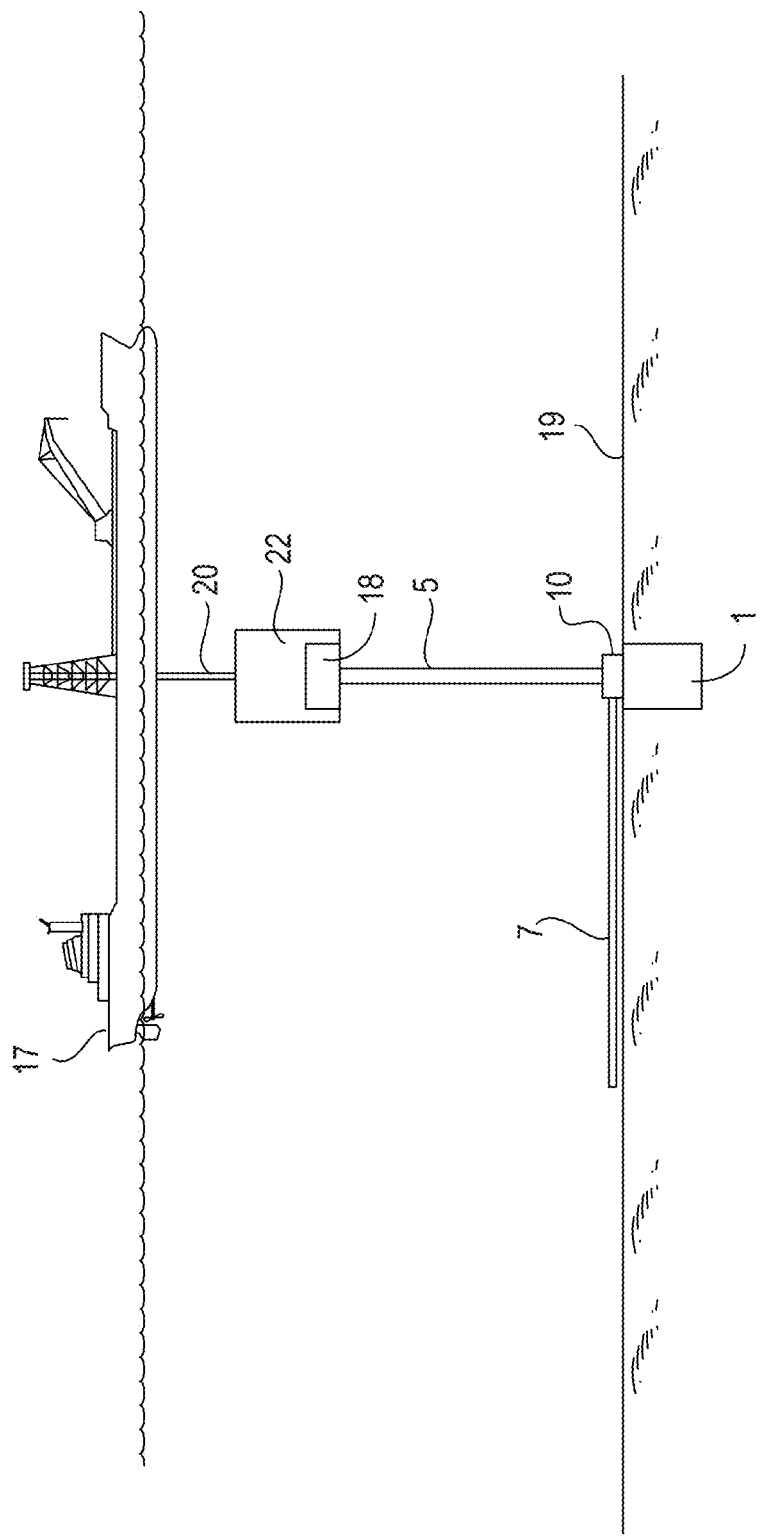

VERTICAL SWIVEL CONNECTION ASSEMBLY AND SYSTEMS AND METHODS FOR USE THEREOF

FIELD

This invention relates in general to the conveyance of hydrocarbons from a subsea well or wells, and in particular to an apparatus and assembly, and methods associated therewith, for conveying the hydrocarbons from a subsea flowline to a floating production unit or vessel at the surface.

BACKGROUND

Within the field of offshore oil and gas production, when conveying hydrocarbons from a subsea well to a vessel at the surface, the hydrocarbons are often transported through flowlines extending along the sea floor and risers connecting the flowlines to floating production units or vessels at the surface. The flowline can extend from a single subsea wellhead, from subsea processing equipment, or from a subsea collection manifold. Tie-in systems refer to systems in which sections of subsea pipeline or flowline are connected to one another and other subsea equipment. One known tie-in system, also referred to as a "hinge over riser assembly" or HORA, is disclosed in U.S. Pat. No. 7,628,568. In the method disclosed in U.S. Pat. No. 7,628,568, a subsea flowline and riser assembly is installed on a sea floor. The method includes providing a flowline having an end connected to a hinge-over joint, and a riser having an end connected to the joint such that the axes of the riser and flowline extend substantially parallel. An end of the flowline opposite the joint is lowered to the sea floor. The end of the flowline connected to the joint is then lowered to the sea floor. The joint is connected to a foundation installed in the sea floor. The riser is rotated about the hinge-over joint such that the riser axis is substantially perpendicular to the flowline axis. A subsea jumper is connected between an opening formed in the flowline and an opening formed in the riser so that the riser is in fluid communication with the flowline. In this cited arrangement the flowline and riser are deployed linked to the joint structure but without a built-in flow path linkage, such that an additional subsea jumper is required to be fabricated pursuant to measurements taken on site. Such measurements, fabrication and installation can be time and labor intensive.

A known variation of the hinge over riser assembly employs a horizontal connection that includes a 90° load path through a flowline-riser connector which has structural and long-term fatigue challenges. These challenges require the addition of a bulky reinforcement structure surrounding the connector load path, which in turn increases the overall assembly size and weight and consequential increased operational risks during installation. Such horizontal connections also require horizontal pulling of the whole assembly, thus sliding the assembly over a surface during positioning prior to mating and locking of the assembly components to each other. The horizontal pulling with sliding introduces potential for malfunction or damage to the assembly. Potential obstructions on the sliding surfaces involved can be caused by marine growth, debris consolidation, corrosion buildup and related factors, which can create risks to the operability of the system.

There exists a need for a subsea tie-in system which would avoid or reduce the aforementioned challenges, potential for damage and potential risks.

SUMMARY

In one aspect, an apparatus useful for connecting a subsea flowline and a riser assembly so that the subsea flowline and the riser assembly can be jointly maneuvered in a subsea environment is provided. The apparatus includes a number of cooperating components. A deployment skid is configured to be positioned on a foundation anchored to the seabed. A conduit having a 90° bend therein is integrated with the deployment skid. One end of the conduit, also referred to as the first conduit end, is connectable to a subsea flowline termination. The opposite end of the conduit, also referred to interchangeably as the second conduit end, is configured to mate with a coupling member at the lower termination of the riser assembly. The coupling member has a generally cylindrical shape with an axial passage therethrough. The coupling member is provided with an internal grasping mechanism that swallows and locks around the second conduit end, thus providing structural connection and a continuous flow path through the flowline and the riser assembly. A pair of guide members is pivotally connected at the deployment skid and at the coupling member. Each guide member has a generally elongated shape and has an elongated slot along the length thereof. Each guide member has a first end pivotally connected to the deployment skid at a position below the first conduit end such that the guide member can be rotated from about 0 to about 90° with respect to a position generally perpendicular to the axis of the second conduit end. Each guide member further has a second end pivotally linked to the coupling member, such that the riser can be rotated from about 0 to about 90° with respect to the primary axis of the guide member. The elongated slot is configured to allow the riser lower termination to be moved downwards vertically from an upper disengaged position to an engaged position thereby connecting the riser lower termination to the second conduit end.

In another aspect, a method for connecting the subsea flowline with the riser assembly is provided to provide a fluid flow path from the subsea flowline to the riser assembly using the apparatus described above. The first conduit end of the conduit is connected to the subsea flowline termination. The deployment skid is positioned on a foundation anchored to the seabed in a desired subsea location such that the second conduit end is generally vertically oriented. The pair of guide members is rotated about the first ends of the pair of guide members such that the pair of guide members is generally parallel to the axis of the second axis, i.e., the axis of the second conduit end, and the coupling member is positioned above the second conduit end. The riser lower termination is connected to the coupling member by passing the riser lower termination through the axial passage of the coupling member. The coupling member is moved downwards thereby connecting the riser lower termination to the second conduit end. Finally, the second conduit end is locked with respect to the coupling member.

In another aspect, a system is provided that includes a subsea flowline having a subsea flowline termination and being positioned on a seabed for conveying fluids therein, a riser assembly having a riser having a riser lower termination for conveying fluids to a topside structure, and the apparatus described above. The subsea flowline termination is connected to the first conduit end of the conduit and the riser lower termination is connected to the second conduit end to provide a fluid flow path from the subsea flowline to the riser assembly.

DESCRIPTION OF THE DRAWINGS

These and other objects, features and advantages of the present invention will become better understood with reference to the following description, appended claims and accompanying drawings where:

FIGS. 4A-4C illustrate a sequence of steps in an installation method according to one exemplary embodiment.

DETAILED DESCRIPTION

Figure 1:
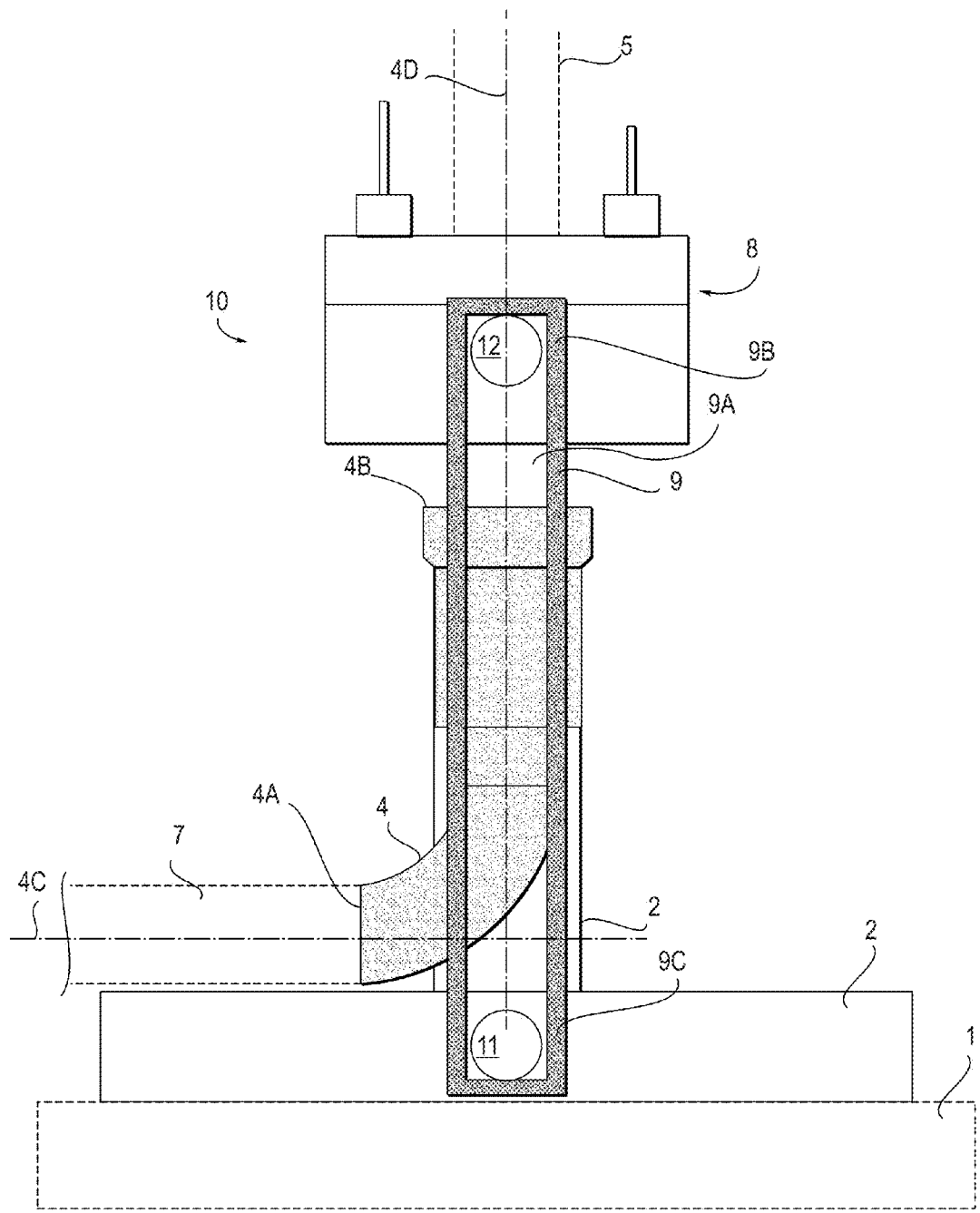
FIG. 1 is a simplified front view illustrating an apparatus according to one exemplary embodiment in a first position.

In one embodiment, an apparatus is provided that is useful for connecting a subsea flowline on a seabed and a riser assembly. The apparatus will now be described. FIG. 1 shows the apparatus 10 in a first position in which the apparatus is being set up for connection. A deployment skid 2 is configured to be positioned on a seabed foundation 1 anchored to the seabed. The seabed foundation 1 can be one or more suction pile(s). The deployment skid 2 can be secured to the seabed foundation 1 by the use of any convenient means such as one or more pin(s), rotating latch connector(s), hydraulic connection, and the like. In one embodiment, the deployment skid 2 has a base portion that is connectable to a seabed foundation for the seabed and a vertical portion that provides further structural support for the apparatus. In one embodiment, the deployment skid 2 can be formed of a steel frame. The deployment skid 2 allows the riser 5 to be lowered or retrieved at a required angular position relative to the subsea flowline 7.

In one embodiment, a conduit 4 is integrated with the deployment skid 2. Preferably, the conduit 4 is permanently secured to the deployment skid 2 in a desired position. The conduit 4 has a 90° bend therein such that the conduit 4 generally forms an elbow. The conduit 4 has a first conduit end 4A and a second conduit end 4B. Each of the first conduit end 4A and second conduit end 4B has an axis there through, labeled as 4C and 4D, respectively. The axes 4C and 4D are generally perpendicular to one another so that when the axis through the first conduit end 4A is horizontally oriented, the axis through the second conduit end 4B is vertically oriented and the second conduit end 4B is consequently oriented to face upward. The first conduit end 4A is connectable to a termination of a subsea flowline 7, also referred to as a subsea flowline termination or a subsea flowline end. The subsea flowline 7 conveys fluids along the seabed. For instance, the subsea flowline 7 is used to convey production fluids from one or more subterranean hydrocarbon reservoir(s). The subsea flowline termination can be connected to the first conduit end 4A by any suitable means, such as by welding, by the use of a bolted flange, and the like. The second conduit end 4B is configured to receive the riser lower termination of the riser 5.

A coupling member 8 is provided for coupling the riser 5 and the second conduit end 4B. The coupling member 8 can take the form of an enclosure or housing having a generally cylindrical shape. The coupling member 8 has a an axial passage therethrough that allows the riser 5 to penetrate from the top of the coupling member 8 and that allows the second conduit end 4B to penetrate from the bottom of the coupling member 8. The coupling member 8 is configured to swallow and lock around both the second conduit end 4B and the riser lower termination 5.

Figure 2:
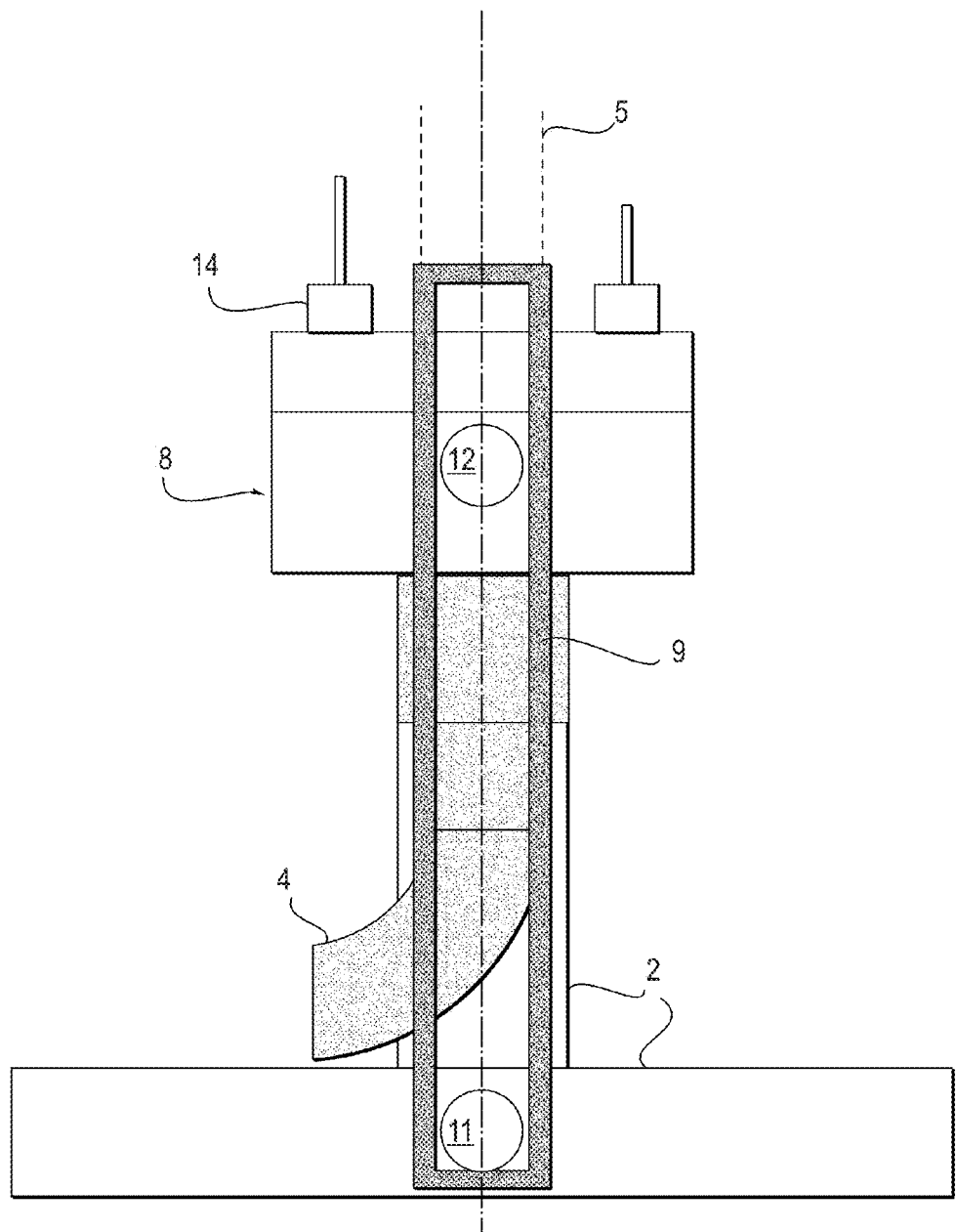
FIG. 2 is a simplified front view illustrating an apparatus according to one exemplary embodiment in a second position.
Figure 3:
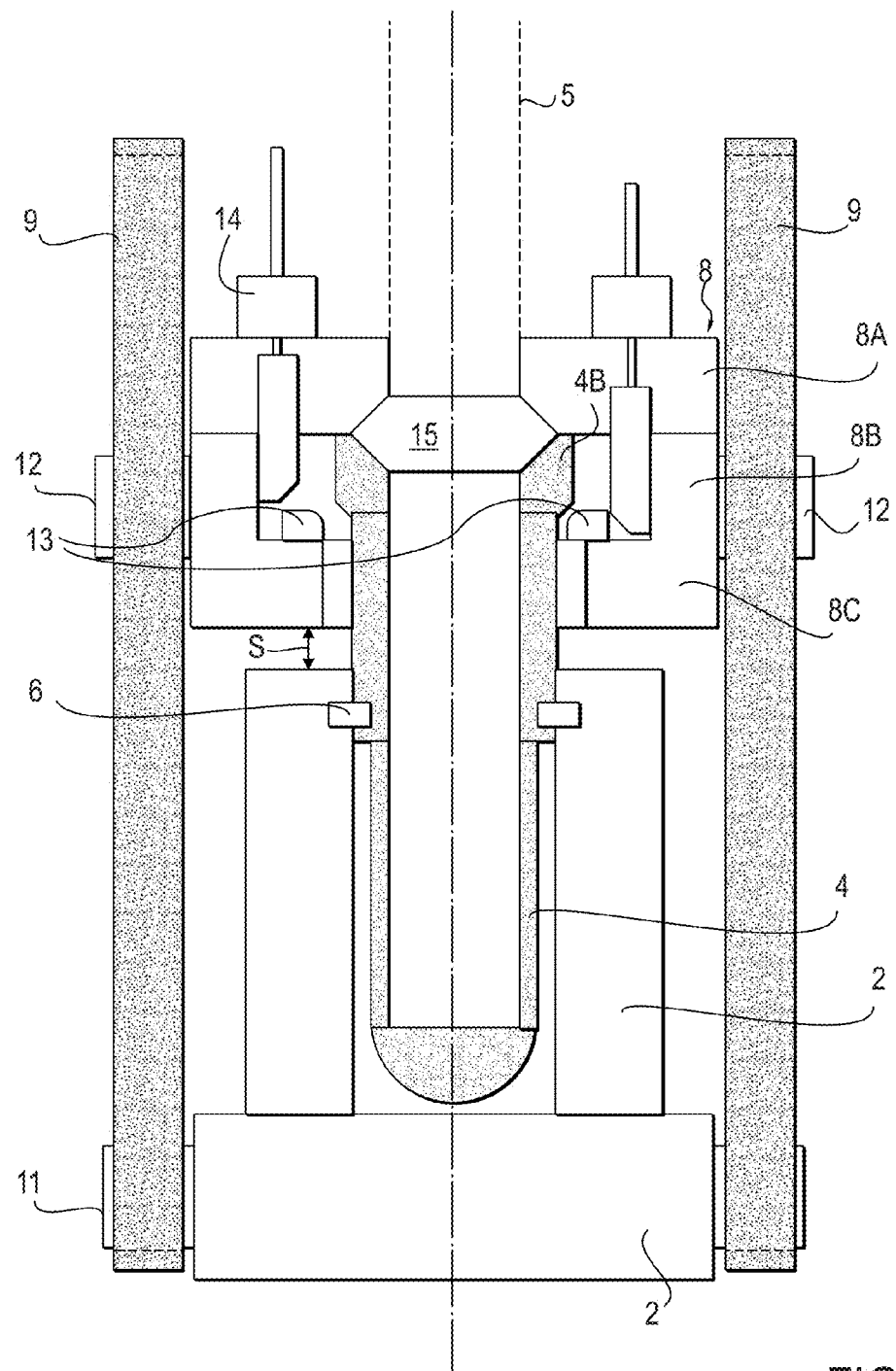
FIG. 3 is a simplified side view illustrating an apparatus according to one exemplary embodiment in a third position.

In one particular embodiment, such as illustrated in FIGS. 1-3, the coupling member 8 can be thought of as having three portions, a coupling member top portion 8A, a coupling member bottom portion 8C and a coupling member middle portion 8B. The three portions can be integral, e.g., when the coupling member 8 is a unitary piece formed by casting or molding. Alternatively, the three portions can be formed separately and securely attached to one another. The coupling member top portion 8A has a coupling member top surface. The coupling member top portion 8A has a top portion axial passage therethrough having a top portion inner diameter configured to allow the riser 5 to pass there through. The coupling member bottom portion 8C has a coupling member bottom surface and a bottom portion axial passage therethrough having a bottom portion inner diameter configured to allow the second conduit end 4B to pass there through. The coupling member middle portion 8B is positioned between the coupling member top portion 8A and the coupling member bottom portion 8C. The coupling member middle portion 8B has a middle portion inner diameter which is greater than either the top portion inner diameter or the bottom portion inner diameter. The coupling member bottom portion 8C is configured to hold the conduit 4 in a desired position having a generally vertical orientation such that the second conduit end 4B is located in the internal space within the coupling member middle portion 8B.

It will be understood by those skilled in the art that other types of coupling members 8 not illustrated here would also be suitable for use in the apparatus 10.

A pair of guide members 9 is provided as illustrated in FIGS. 1-3. Each guide member 9 is pivotally linked to the deployment skid 2 on one end, and to the coupling member 8 at the other end, thus the pair of guide members 9 links the deployment skid 2 to the coupling member 8. The guide members 9 are positioned so that one is on each side of the apparatus 10, symmetrically located on either side of the plane created by the bend in the conduit 4, as shown. Each guide member 9 has a generally elongated shape having a length and has an elongated slot 9A along the length thereof. The first end 9C of the guide member is pivotally linked to the deployment skid 2 at a position below the first conduit end such that the guide member 9 can be rotated from about 0 to about 90° with respect to a position generally perpendicular to the axis 4D. In other words, the pair of guide members 9 can be rotated about the first ends 9C of the pair of guide members such that the pair of guide members 9 is generally parallel to the axis 4D, as shown in FIG. 1. In this position, the bottom surface of the coupling member bottom portion 8C is generally perpendicular to the axis 4D of the second conduit end 4B.

The second end 9B of the guide member that is pivotally linked to the coupling member 8 is linked such that the riser 5, once in position, can be rotated from about 0 to about 90° with respect to the primary axis of the guide member 9. The elongated slot 9A is configured to allow the coupling member 8 as coupled with the lower termination of the riser 5 to be moved downwards vertically from an upper disengaged position (as shown in FIG. 1) to an engaged position (as shown in FIG. 2), thereby connecting the lower termination of the riser 5 to the second conduit end 4B The pair of guide members 9 has freedom of movement for self-aligning when the apparatus is in the unlocked or disengaged position, as shown in FIG. 1.

In one embodiment, the guide members 9 can be pivotally connected to the coupling member 8 through the use of pivot pins 12 positioned through the second ends 9B of the pair of guide members and into the coupling member 8. Likewise, the guide members 9 can be pivotally connected to the deployment skid 2 through the use of pivot pins positioned through the first ends 9C of the pair of guide members and into the deployment skid 2. Alternatively, the guide members 9 can be pivotally connected to the deployment skid 2 through the use of an elongated pivot bar 11 positioned through the first ends 9C of the pair of guide members and through at least a portion of the deployment skid 2.

The riser lower termination, i.e., the lower end of the riser 5, is seamlessly linked to the coupling member 8 by bonding the riser lower termination to the coupling member top portion 8A. The riser lower termination is welded to the coupling member 8. When the riser 5 is coupled to the coupling member 8 as shown in FIG. 1, the riser 5 can be lifted, rotating the pair of guide members 9 around the pivot bar 11. The riser 5 can be lifted until the coupling member 8 reaches the desired vertical position above the second conduit end 4B. The bottom portion axial passage of the coupling member bottom portion 8C is positioned above the second conduit end 4B such that the second conduit end 4B is in position to receive the riser lower termination. At this point, the coupling member 8 can be moved downwards. The downward movement is allowed by the elongated slots 9A within the guide members 9. The pivot pins 12 are sized to fit within the elongated slots 9A so that the downward movement moves the coupling member 8 precisely into the desired position with respect to the second conduit end 4B. Thus the riser lower termination is connected to the second conduit end 4B.

Finally, the riser lower termination is locked into place with respect to the second conduit end 4B in the desired engaged position using the locking mechanism. As shown in FIG. 3, the locking mechanism can use an actuation device driven by any suitable type of energy. For example, the actuation device can be a hydraulic cylinder 14. The actuation device is used to move the grasping element 13 from an initial, unlocked position away from the second conduit end 4B as shown in the left side of FIG. 3, to a locked position where the grasping element 13 engages the shoulder of the second conduit end 4B as shown in the right side of FIG. 3, to forcefully pull the riser coupling member 8 against the second conduit end 4B, compressing the seal element 15.

The vertical attachment position 6, at which the conduit 4 is attached to the deployment skid 2, is selected to ensure that a space S is provided between the bottom surface of the coupling member 8 and the top of the deployment skid 2, such that when the apparatus is completely engaged as shown in the right side of FIG. 3, the second conduit end 4B and the coupling member 8 is in full contact and the seal element 15 is compressed. The necessary spacing S will vary according to the particular design. The apparatus herein described and shown in FIGS. 1-3 is merely one example of a connection method which can be replaced by any other suitable variation as would be apparent to one skilled in the art.

Figure 4A:
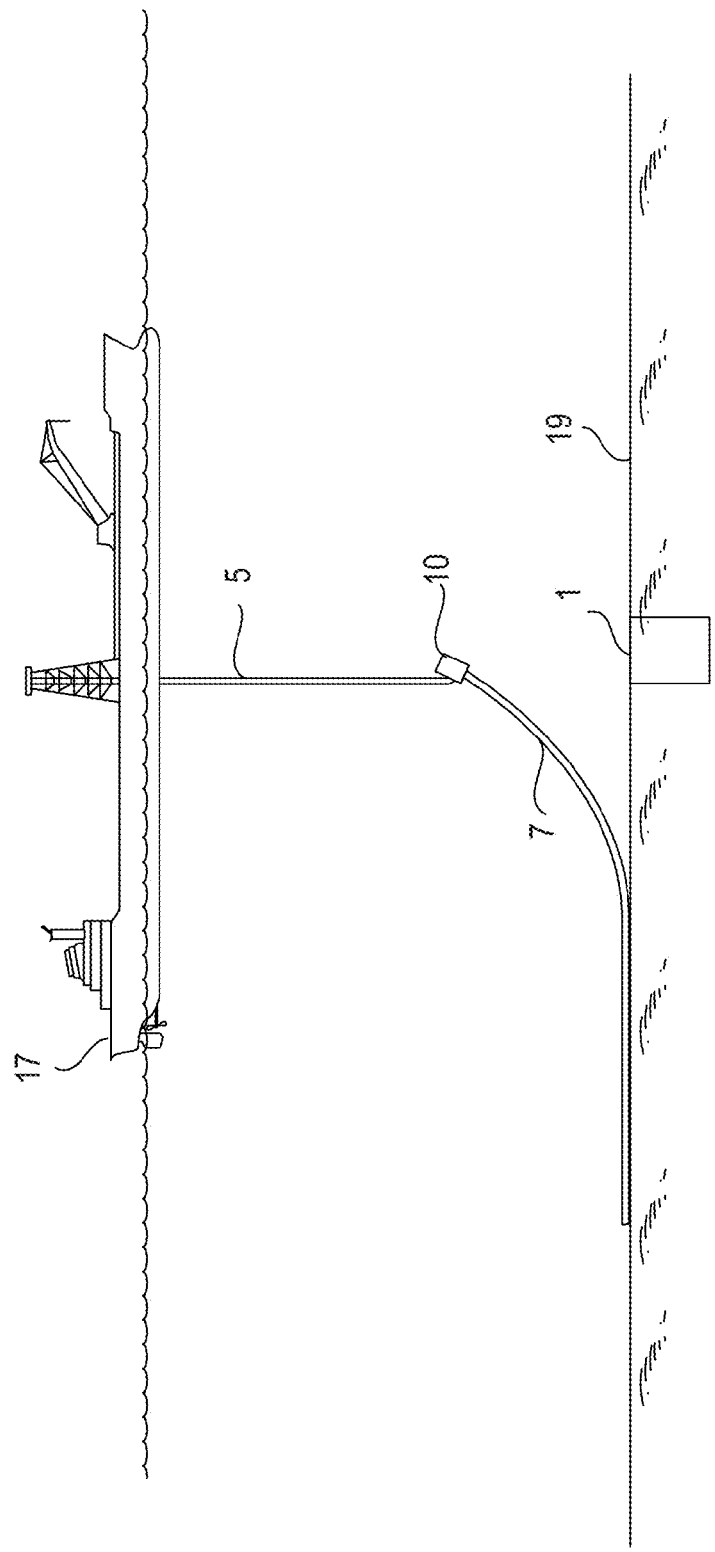

Referring to FIGS. 4A-4C, one embodiment of a method for using the above-described apparatus to connect a subsea flowline with a riser assembly to provide a fluid flow path from the subsea flowline to the riser assembly will now be described. Initially, the termination of the subsea flowline 7 is connected to the first conduit end 4A. Likewise, the lower termination of the riser 5 is coupled with the coupling number 8 and connected to the second conduit end 4B. Thus the subsea flowline 7 and the riser 5 are connected to the apparatus 10. These connections can be made on a floating vessel 17 or prior to loading onto the vessel 17. As shown in FIG. 4A, the riser 5 is then lowered from the vessel 17 at a desired location, thereby lowering the apparatus 10 which is connected to riser 5. While the apparatus 10 is being lowered, the apparatus 10 is in its unlocked, disengaged position, thus allowing the guide members 9 to freely pivot. As a result, the riser 5 need not be laid on the seabed 19 during installation. Rather, the riser 5 is permitted to remain vertically aligned while apparatus 10 is being lowered to the seabed 19. As a consequence, deployment of the tie-in system is faster than previously known methods. Furthermore, strain on the riser 5 due to bending along the lay spread is reduced compared to previously known deployment methods.

As shown in FIG. 4B, the apparatus 10 is positioned such that the deployment skid 2 is positioned on the seabed foundation 1, which is in turn anchored to the seabed 19. The deployment skid 2 is positioned so that the riser 5 is generally vertically oriented. As shown, in one embodiment, a wire or cable 20 can be used to suspend a buoyancy connection interface 18 connected to the upper end of the riser 5 from the vessel 17. As shown in FIG. 4C, a buoyancy can or module 22 can be attached to the buoyancy connection interface 18, thus providing the riser 5 with buoyancy. For the sake of illustration, the buoyancy can or module 22 is shown larger than would likely be in relation to the other system components. It is noted that the drawings are not to scale.

Alternatively, in a less preferred embodiment, the connection of the subsea flowline 7 to the first conduit end 4A and/or of the lower termination of the riser 5 to the second conduit end 4B can occur once the apparatus 10 is positioned on the seabed foundation 1.

The resulting subsea system is useful for conveying production fluids from the subsea flowline 7, through the apparatus 10 and into the riser 5. The riser 5 can be further connected to a topside structure for conveying the fluids thereto.

The apparatus 10 allows for simpler connection of a subsea flowline and a riser assembly so that the subsea flowline and the riser assembly can be jointly maneuvered in a subsea environment than previously known assemblies and systems. The apparatus 10 and methods for using it eliminate the need for horizontal dragging and pulling of components over surfaces prior to mating and locking to each other. The apparatus 10 and methods for using it also eliminate the need for subsea jumpers in making the connection between the subsea flowline 7 and the riser assembly 5. Use of the disclosed system provides a streamlined load path through the apparatus 10.

It should be noted that only the components relevant to the disclosure are shown in the figures, and that many other components normally part of a subsea tie-in system and/or riser system are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

From the above description, those skilled in the art will perceive improvements, changes and modifications, which are intended to be covered by the appended claims.

What is claimed is:

1. An apparatus useful for connecting a subsea flowline and a riser assembly so that the subsea flowline and the riser assembly can be jointly maneuvered in a subsea environment, comprising:
   a. a deployment skid configured to be positioned on a foundation anchored to the seabed;
   b. a conduit having a 90° bend therein integrated with the deployment skid, a first conduit end having a first axis and a second conduit end having a second axis approximately perpendicular to the first axis, wherein the first conduit end is connectable to a subsea flowline termination and the second conduit end is configured to mate with a riser lower termination;
   c. a coupling member having a generally cylindrical shape and an axial passage therethrough configured to swallow the second conduit end and lock around both the second conduit end and the riser lower termination; and
   d. a pair of guide members, each guide member having a generally elongated shape having a primary axis and a length and comprising:
      i. an elongated slot along the length of the guide member;
      ii. a first end pivotally linked to the deployment skid at a position below the first conduit end such that the guide member can be rotated from about 0 to about 90° with respect to a position generally perpendicular to the second axis;
      iii. a second end pivotally linked to the coupling member, such that the riser can be rotated from about 0 to about 90° with respect to the primary axis of the guide member;
         wherein the elongated slot is configured to allow the riser lower termination to be moved downwards vertically from an upper disengaged position to an engaged position thereby connecting the riser lower termination to the second conduit end.

2. The apparatus of claim 1, wherein the first ends of the pair of guide members are pivotally linked to the deployment skid by the use of a pivot bar positioned through the first ends of the pair of guide members and through a portion of the deployment skid.

3. The apparatus of claim 1, wherein the second ends of the pair of guide members are pivotally linked to the coupling member by the use of pivot pins positioned through the second ends of the pair of guide members and into the coupling member.

4. The apparatus of claim 1, wherein the conduit is integrated with the deployment skid such that a desired spacing between the coupling member and the deployment skid is ensured.

5. The apparatus of claim 1, wherein the coupling member further comprises a locking mechanism to lock the second conduit end in the desired position with respect to the coupling member.

6. The apparatus of claim 5, wherein the locking mechanism comprises at least one movable element for engaging the second conduit end, wherein each movable element is controlled by a hydraulic cylinder.

7. The apparatus of claim 1, further comprising a fluid seal configured to be positioned between the second conduit end and the coupling member when the apparatus is in the engaged position.

8. The apparatus of claim 1, wherein the coupling member comprises:
   a. a coupling member top portion comprising a coupling member top surface and having a top portion axial passage therethrough having a top portion inner diameter configured to allow the riser lower termination to pass there through;
   b. a coupling member bottom portion comprising a coupling member bottom surface and having a bottom portion axial passage therethrough having a bottom portion inner diameter configured to allow the second conduit end to pass there through; and
   c. a coupling member middle portion positioned between the coupling member top portion and the coupling member bottom portion and having a middle portion inner diameter greater than the top portion inner diameter and the bottom portion inner diameter;
      wherein the coupling member bottom portion is configured to hold the second conduit end in a desired position having a generally vertical orientation such that the second conduit end is located within the coupling member middle portion.

9. A method for connecting a subsea flowline having a subsea flowline termination and being positioned on a seabed with a riser assembly having a riser lower termination to provide a fluid flow path from the subsea flowline to the riser assembly utilizing the apparatus of claim 1, comprising:
   a. connecting the first conduit end of the conduit to the subsea flowline termination;
   b. positioning the deployment skid on a foundation anchored to the seabed in a desired subsea location such that the second conduit end is generally vertically oriented;
   c. rotating the pair of guide members about the first ends of the pair of guide members such that the pair of guide members is generally vertically oriented and the coupling member is positioned above the second conduit end;
   d. connecting the riser lower termination to the coupling member by passing the riser lower termination through the axial passage of the coupling member;
   e. positioning the axial passage of the coupling member above the second conduit end such that the second conduit end is positioned to receive the riser lower termination;
   f. moving the coupling member downwards thereby connecting the riser lower termination to the second conduit end; and
   g. locking the second conduit end with respect to the coupling member.

10. A subsea system, comprising:
   a. a subsea flowline having a subsea flowline termination and being positioned on a seabed for conveying fluids therein;
   b. a riser assembly having a riser lower termination and comprising a riser for conveying fluids to a topside structure; and
   c. the apparatus of claim 1;

wherein the subsea flowline termination is connected to the first conduit end of the conduit and the riser lower termination is connected to the second conduit end to provide a fluid flow path from the subsea flowline to the riser assembly.

\* \* \* \* \*